(12) United States Patent
Thiedig

(10) Patent No.: US 8,755,051 B2
(45) Date of Patent: Jun. 17, 2014

(54) SCANNING DEVICE AND METHOD FOR DETECTING THE CONTOUR OF AN OBJECT

(75) Inventor: Ullrich Thiedig, Erkerode (DE)

(73) Assignee: Weber Maschinenbau GmbH Breidenbach, Breidenbach (DE)

( * ) Notice: Subject to any disclaimer, the term of this patent is extended or adjusted under 35 U.S.C. 154(b) by 453 days.

(21) Appl. No.: 13/243,769

(22) Filed: Sep. 23, 2011

(65) Prior Publication Data
US 2012/0097002 A1 Apr. 26, 2012

(30) Foreign Application Priority Data

Oct. 22, 2010 (DE) .................... 10 2010 049 310

(51) Int. Cl.
*G01J 1/00* (2006.01)
*G01N 21/00* (2006.01)
*G01B 11/30* (2006.01)
*G01B 11/24* (2006.01)

(52) U.S. Cl.
USPC ......... 356/601; 356/121; 356/603; 356/239.3

(58) Field of Classification Search
USPC ............... 356/237.1–241.6, 242.1–243.8, 356/426–431, 600–640; 99/537; 426/518; D07/381
See application file for complete search history.

(56) References Cited

U.S. PATENT DOCUMENTS

| | | | | |
|---|---|---|---|---|
| 3,762,818 A | * | 10/1973 | Johnson et al. | 356/605 |
| 4,545,447 A | * | 10/1985 | Spooner et al. | 177/165 |
| 4,825,263 A | * | 4/1989 | Desjardins et al. | 356/603 |
| 4,843,932 A | | 7/1989 | Weber et al. | |
| 6,377,353 B1 | * | 4/2002 | Ellis | 356/603 |
| 6,549,289 B1 | * | 4/2003 | Ellis | 356/603 |
| 6,556,783 B1 | * | 4/2003 | Gelphman | 396/20 |
| 6,636,255 B1 | * | 10/2003 | Kobayashi et al. | 348/98 |
| 6,882,434 B1 | * | 4/2005 | Sandberg et al. | 356/601 |
| 7,214,128 B2 | * | 5/2007 | Kriesel | 452/157 |
| 7,450,247 B2 | * | 11/2008 | Sandberg et al. | 356/601 |
| 7,623,249 B2 | * | 11/2009 | Sandberg et al. | 356/601 |
| 7,809,193 B2 | * | 10/2010 | Iwasaki et al. | 382/181 |
| 7,853,046 B2 | * | 12/2010 | Sharony | 382/110 |

(Continued)

FOREIGN PATENT DOCUMENTS

| DE | 3923337 A1 | 1/1991 |
|---|---|---|
| DE | 4413568 A1 | 10/1995 |

(Continued)

OTHER PUBLICATIONS

Search Report dated Oct. 22, 2010 for DE 10 2010 049 310.4.
English Language Abstract for DE 101 36 809.
Extended European Search Report for EP 11007674 dated Dec. 11, 2011.

*Primary Examiner* — Gregory J Toatley
*Assistant Examiner* — Jarreas C Underwood
(74) *Attorney, Agent, or Firm* — Rader, Fishman & Grauer PLLC

(57) ABSTRACT

The disclosure relates to a scanning device for detecting the contour of an object. The scanning device has a light source for generating a light pattern on the surface area of the object, and a camera for detecting the light pattern on the surface area of the object. The disclosure describes that the one light source includes at least one incoherent spot light source, and that between the at least one spot light source and the object, a shadow caster defines the light pattern on the surface area of the object. The disclosure also relates to a method for detecting the contour of an object.

15 Claims, 2 Drawing Sheets

(56) References Cited

U.S. PATENT DOCUMENTS

| | | | |
|---|---|---|---|
| 8,373,749 B2 * | 2/2013 | Burton | 348/89 |
| 2003/0205120 A1 * | 11/2003 | Thiedig et al. | 83/35 |
| 2004/0035276 A1 | 2/2004 | Weber | |
| 2004/0200365 A1 * | 10/2004 | Young | 99/537 |
| 2005/0120844 A1 * | 6/2005 | Weber | 83/35 |
| 2006/0254402 A1 | 11/2006 | Weber | |
| 2007/0177160 A1 * | 8/2007 | Sasaki | 356/603 |
| 2010/0007896 A1 | 1/2010 | Fishbaine | |
| 2010/0008588 A1 * | 1/2010 | Feldkhun et al. | 382/206 |
| 2010/0239136 A1 | 9/2010 | Gandyra et al. | |
| 2010/0307303 A1 | 12/2010 | Weber | |

FOREIGN PATENT DOCUMENTS

| | | |
|---|---|---|
| DE | 19525741 A1 | 1/1997 |
| DE | 19604254 A1 | 8/1997 |
| DE | 19713163 A1 | 10/1998 |
| DE | 19839257 A1 | 3/2000 |
| DE | 19844436 A1 | 3/2000 |
| DE | 10136809 A1 | 2/2003 |
| DE | 102008047816 A1 | 4/2010 |
| EP | 1 178 878 A1 | 2/2002 |
| JP | 1132333 A | 5/1989 |
| JP | 7184534 A | 7/1995 |

* cited by examiner

SCANNING DEVICE AND METHOD FOR DETECTING THE CONTOUR OF AN OBJECT

CROSS-REFERENCE TO RELATED APPLICATIONS

This application claims priority based on German Patent Application No. 10 2010 049 310.4, filed Oct. 22, 2010, which is hereby incorporated by reference in its entirety.

FIELD OF TECHNOLOGY

This disclosure relates to a scanning device.

BACKGROUND

Such a scanning device and such a method relate to EP 1 178 878 B1 or from DE 196 04 254. In the grant procedure, the opposition procedure or the nullity procedure relating to these two protective rights, a great number of additional documents referring to similar scanning devices and methods have been cited, in particular JP 1132333 A or JP 7184534 A.

These conventional scanning devices serve to detect the outer contour of an object. Said object may be, in particular, a food product that is to be cut into constant-weight portions or slices. Distributed over the length of the object, a great number of contours is detected wherefrom a volume model of the object, i.e. a three-dimensional model of the object, can be subsequently calculated. If the weight force of the object is additionally measured, an average density of the product can be calculated from the weight and the overall volume, and on the basis thereof, taking into account the outer contour, cutting positions for constant-weight slices can be calculated.

In prior art, the peripheral contour of the object is often detected by means of the so-called light section technique. For this purpose, in the above-cited documents a line of laser light is projected onto the product by means of one or a plurality of overlapping line lasers. This linear projection of the laser light is imaged by means of a camera. From the course and the location of the light line on the object, the course of the respective surface contour can be derived.

Cutting machines for cutting up food products, so-called slicers, are for example known from the following documents: DE 3713536 A1, DE 3923337 A1, DE 4413568 C5, DE 10054514 A1, DE 10131701 A1, DE 19604254 B4, DE 10327249 A1, DE 19525741 A1, DE 19713163 A1, De 19839257 A1, DE 19844436 C2, and DE 102009023729 A1.

Some of these cutting machines already use scanning devices to detect the outer contour of the food products to be cut up. Frequently, the object of this contour detection is to cut up slices or portions of the product as constant as possible in weight.

Apart from the area of food processing, scanning devices for the detection of the contour or of the 3D coordinates of objects are also known. Thus, DE 10 2008 047 816 A1 describes a device for detecting the 3D coordinates of teeth or tooth models. This device, however, has among other problems the drawback that the scanner used therein must be guided around the whole object in order to obtain a sufficient number of data for the representation of the object. US 2007/0177160 A1 discloses a further device for obtaining 3D coordinates of an object, in particular a book. US 2010/0008588 A1 aims at the 3D localization of certain structures on objects, and not at the 3D detection of these objects themselves. Finally, US 2010/0007896 A1 discloses an apparatus for measuring, in particular, the height of electronic components.

SUMMARY

In practice, it has become obvious that the conventional scanning devices are still improvable in their precision. It is an object of the present invention to provide a scanning device and a method for detecting the contour of an object which, by using constructive measures as simple as possible, achieve an improvement with regard to their precision.

This object is achieved by a scanning device comprising the characteristics of claim 1, and by a method comprising the characteristics of claim 11. Advantageous embodiments of the invention are provided in the sub-claims.

The scanning device according to the invention is distinguished by the fact that, contrary to prior art, it does not use a laser as a light source, but an incoherent light source (or a plurality of incoherent light sources). Due to the use of an incoherent light source, interference phenomena such as the so-called speckles on the surface of the object are avoided. Such interference phenomena would otherwise lead to an inhomogeneous and incontrollable light distribution which impairs the resolution. This drawback is avoided by the use of an incoherent light source. Moreover, incoherent light sources offer the advantage that even at higher light intensities they are not detrimental to the human eye, contrary to laser light. Therefore, by using an incoherent light source, the light pattern can be generated without complex protective measures even if the light intensity of the light source is higher than in the conventionally used line laser.

Furthermore, the invention provides a shadow caster, i.e. a structure casting shadows, arranged between the light source and the object. The incoherent light emitted by the light source is first incident on the shadow caster and is partially blocked by the same. Only in the non-blocked areas, the light reaches the object so as to form the light pattern on the surface area of the object. Said shadow caster, i.e. the structure casting shadows, can be of a very plain configuration. In a simple case, it may be a field diaphragm, viz. a planar structure that lets pass light only beyond a shade edge. The light pattern on the surface of the object is, in this case, an illuminated half-plane.

The provision of a shadow caster between the light source and the object offers the further advantage that this shadow caster can be exchanged, if necessary, in order to generate another light pattern on the object in a constructively simple manner, in the case that said other light pattern were better suited to detect the contour of the respective object.

The use of the scanning device according to the invention on or for a cutting machine for slicing food products, a so-called slicer, has turned out to be particularly favorable. In this case, the detected contour of the object, i.e. the to-be-cut-up or cut-up food product, can be subjected to a control which, based on the detected contour, simulates for example a 3D volume model of the food product to be cut up. On the basis of this simulation, constant-weight or constant-volume portions can on demand be calculated and sliced by means of the cutting machine.

The at least one light source is preferably a spot light source. In contrast to a planar light source, a sharp light pattern can be generated on the surface of the object in a constructively and optically simple way. This brings about a further improvement of the precision of the scanning device according to the invention.

In a favorable embodiment, the at least one incoherent light source is a light emitting diode, abbreviated LED. Such LEDs are low-cost, have a long service life, are not detrimental to the human eye, scarcely produce heat and can be adjusted in their brightness via the current supplied to them. For the scanning device according to the invention, LEDs can be chosen in a color that offers the highest possible contrast of the light pattern on the surface area of the object.

It is particularly convenient to provide not only one light source but a plurality of incoherent light sources. This is of advantage in that also a larger surface area on the object can be illuminated with a constant intensity so that the contour of the object can be detected with high precision over the whole object even on larger, extended objects.

When a plurality of spot light sources is provided, it is advantageous to arrange these spot light sources on a line the course of which corresponds to a contour of the shadow caster or is congruent thereto. If the shadow caster has a straight outer edge, the spot light sources could, for example, also be disposed on a straight line so as to be able to uniformly illuminate each spot along the outer edge of the shadow caster.

If the shadow caster has, for example, such a straight shadow edge, the light pattern on the object can be an illuminated half-plane. This extremely simple light distribution can be well detected by the camera and can be precisely evaluated by means of image recognition.

Depending on the shape of the object and on the respective arrangement of the light source and the shadow caster, it can be advantageous if the shadow edge is straight or if it has a curvature. The respective aim is to produce on the surface of the object a light pattern with the highest contrast possible, that can be read out and evaluated with high precision.

Preferably, beam-shaping optics are provided for the incoherent light. These beam-shaping objects can provide for a further improvement of the sharpness and the contrast of the light pattern generated on the surface area of the object. The beam-shaping optics can be a lens or a lens system.

In an advantageous configuration variant, the positions of the at least one light source, the position and/or the orientation of the shadow caster and/or an optical characteristic of the beam shaping optics are adjustable. This adjustability or possibility to change the settings allows to adjust the component parts of the scanning device participating in the generation of the light pattern such that in the field of vision of the camera, an optimally readable light pattern with a contrast as high as possible or with edges as sharp as possible is formed.

The plurality of spot light sources may be provided in the form of a common light strip. As an alternative, it is conceivable to use a largely homogeneous, line-shaped light band.

Preferably, an evaluation unit is provided and is adapted to determine the course of a shadow border in the light pattern detected by the camera. This evaluation unit may be integrated into the scanning device or may be connected to the scanning device by a data communication means. The determination of the contour on the basis of the course of a shadow border is significantly more precise than the conventional determination of the contour based on the course of a laser light line. While in the conventional light line the intensity of the light, starting from the maximum, decreases to both sides, and even by focusing a comparatively broad light strip is formed, the light intensity with the use of a shadow border only increases in one direction from a dark range to a bright range. Due to a suitably programmed image recognition, it can be determined at any point of the shadow border or at discrete points along the shadow border where, for example, the intensity of the light exceeds a certain threshold, or where the light intensity corresponds to the mean value of light intensity in the bright range and in the dark range. Contrary to the conventional light section method, in the version of the light section method according to the invention, the location of the maximum of a light distribution must not be recognized, but it is sufficient to determine the location at which a certain threshold is exceeded, or even to form a mean value. This substantially reduces the calculating effort and leads to an acceleration of the scanning process.

Finally, the evaluation unit may also be configured to determine a contour of an object from the detected course of the shadow border.

The invention also refers to a method for detecting the contour of an object. In this method, a light source comprising at least one LED generates a light pattern on the surface area of the object, said light pattern being detected by means of a camera. As has already been explained before, a shadow caster blocks the path of part of the light from the LED to the object, such as to generate a light pattern on the object, in particular a shadow border.

A suppression of secondary light can be improved by flash-operating the at least one LED.

BRIEF DESCRIPTION OF THE DRAWINGS

In the following, an advantageous embodiment of the present invention will be explained in more detail on the basis of a drawing. The figures show.

Identical components are designated by identical reference numerals in all the figures.

DETAILED DESCRIPTION

Figure 1:
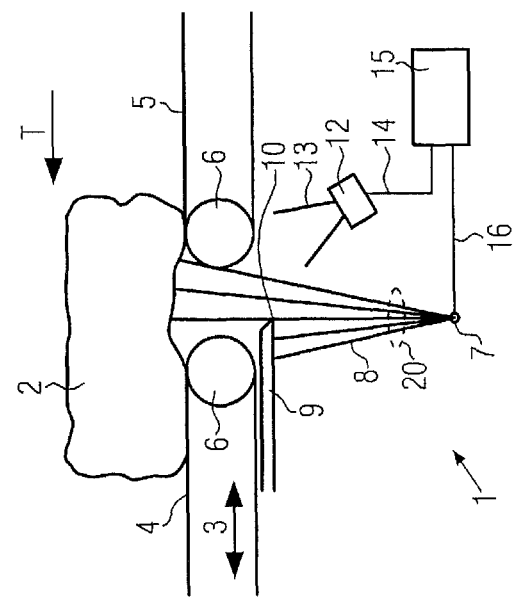
FIG. 1 is a schematic view of an embodiment of a scanning device according to the invention, obliquely to the transport direction of the object.

FIG. 1 schematically shows a scanning device 1 according to the invention, serving to detect the contour of an object 2 which may be, for example, a food product.

The scanning device 1 is disposed below a conveyor line 3 for the objects 2. This conveyor line comprises a first conveyor belt 4 and a second conveyor belt 5, said belts being laid around deflection pulleys or drive rollers 6. Between the adjacent deflection pulleys 6 of the two conveyor belts 4, 5, a space is provided, exposing the lower side of the object 2. At this location, the contour of the lower side of the object 2 is detected by means of the scanning device 1.

The scanning device 1 comprises a light source 7. In the present embodiment, the light source 7 is a group of light-emitting diodes (LEDs) 7. These LEDs 7 are emitting an incoherent light radiation 8, FIG. 1 representing single light rays thereof. For the sake of clarity, it is to be noted here that the light source 7 does not emit single discrete rays but a compact light beam. The representation of discrete light rays 8 in FIG. 1 only is for clearness.

Between the light source 7 and the object 2, a shadow caster 9, i.e. a shade-casting structure 9, is disposed. In the present embodiment, said shadow caster 9 is a field diaphragm, or field iris diaphragm, limiting the area illuminated by the light source 7 on the object 2. The whole light 8 incident on the shadow caster 9 on the left of a shade edge 10 in the view of FIG. 1 is blocked by the shadow caster 9. The remaining light from the light source 7 attains the object 2 and forms a light pattern 11 on the lower side of object 2 (cf. also FIG. 3a). In the present embodiment the light pattern 11, due to the shape and the arrangement of shadow caster 9, corresponds to a half-plane: one half of the plane is brightly illuminated whereas the other half of the plane remains dark.

A camera 12, for example a CCD camera, is disposed and aligned such that it detects and maps via its field of vision 13 the light pattern 11 on the object 2. Through a data line 14, the camera 12 is connected to a control and evaluation unit 15. A further control and evaluation unit 16 connects the control and evaluation unit 15 to the light source 7.

Figure 2:
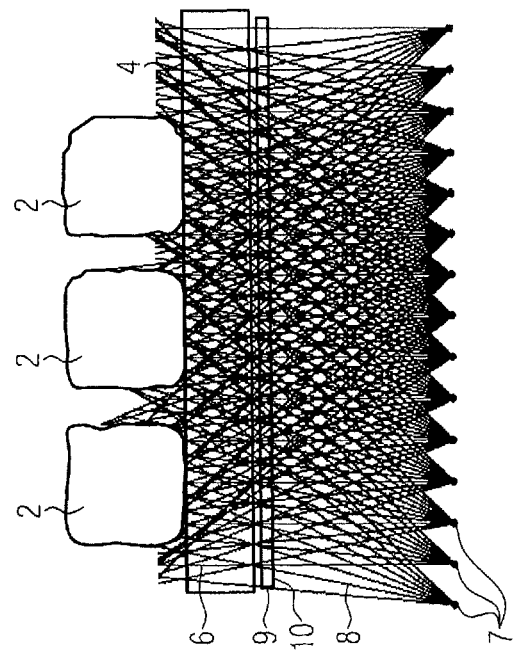
FIG. 2 is a view of the scanning device shown in FIG. 1, in the transport direction of the object.

FIG. 2 shows the scanning device 1 represented in FIG. 1 in the transport direction T of the objects 2 along the conveyor line 3. As can be seen here, a plurality of objects 2 (in the present embodiment: three) are placed side-by-side on the surface of the conveyor belt 4 of the conveyor line 3. In particular, it can be seen that the scanning device 1 comprises a large number of LEDs 7. In the embodiment shown, 15 LEDs 7 are arranged on a common straight line situated in parallel to the shadow edge 10 of shadow caster 9. The light beams 8 of the light sources 7 passing the shadow caster 9 are incident on the surfaces of the objects 2 with different angles. This makes it possible to also illuminate undercuts on the surface of the objects 2 so as to detect the contour of the objects 2 with still greater precision.

Figure 3A:
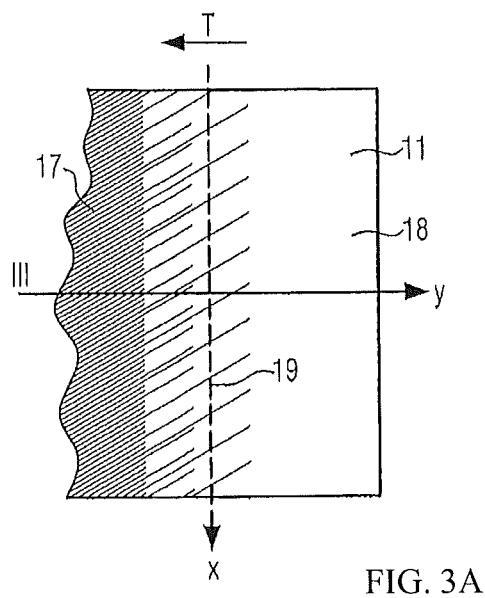
FIG. 3A is a partial view of the light pattern generated by the scanning device on the object.

FIG. 3a shows the light pattern 11 generated on the surface of object 2 by means of the scanning device 1 represented in FIG. 1. This light pattern 11, only a small section of which is represented in FIG. 3a, comprises a dark area 17 and a bright area 18 adjoining each other at a shadow border 19. Ideally, the shadow border 19 is extremely sharp-cut so that the light intensity I suddenly increases from a low value in the dark area 17 to a high value in the bright area 18. In real fact, however, the light intensity I will not increase all of a sudden but continuously, at least by using a correspondingly high enlargement on the shadow border 19. This is indicated in FIG. 3a by the shaded representation.

Figure 3B:
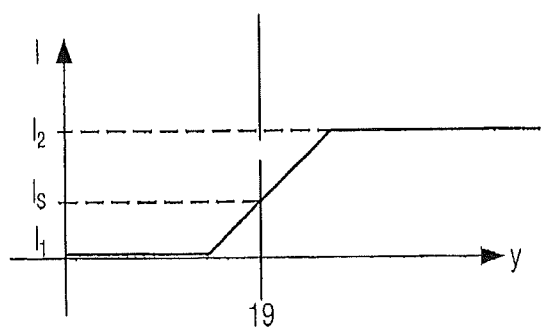
FIG. 3B is a cutting machine comprising a scanning device.

The distribution of light intensity in the y direction (opposite to the transport direction T) of light pattern 11 according to FIG. 3a is again represented in an intensity diagram in FIG. 3b. In the dark area 17, the light intensity has a comparatively low value $I_1$. In the vicinity of the shadow border 19, the light intensity increases (in the present idealized example: linearly) from the low value to a high value $I_2$ in the bright area 18.

In the following, the operation of the scanning device 1 and the procedural sequence of an embodiment of the method according to the invention will be explained, respectively.

The objects 2 are conveyed in the transport direction T on the conveyor line 3. This transport can be performed continuously or in incremental steps. A light pattern 11 is generated on the lower side of the object 2 by means of the scanning device 1 during the transport of the objects 2, in an intermittent transport preferably during standstill of the object 2. The shadow caster 9, as has already been explained, blocks part of the light 8 emitted by the light sources 7 so that, for example, a half-plane on the lower side of the object 2 is illuminated. The light sources 7 can be controlled by means of the control and evaluation unit 15 such that they are flash-operated, so as to generate a light pattern 11 on the object 2 only during the flash.

The light pattern 11 generated on the object 2 is detected by means of the camera 12. The image taken by the camera 12 is sent in digital form via the data line 14 to the control and evaluation unit 15. The latter is programmed to draw conclusions as to the shadow border 19 and its course from the intensity distribution on the image picked up by the camera 12.

For the determination of the shadow border 19, various methods are available. For example, the evaluation unit 15 can determine in the y-direction, i.e. in each line of the image detected by the camera 12, at which of the pixels a certain intensity threshold value $I_s$ is reached or exceeded. This pixel is then defined as being part of the shadow border 19. Alternatively, the evaluation unit 15 could determine the intensity values $I_1$, $I_2$ in the dark or bright area 17, 18 of the light pattern 11 and form a mean value $M=(I_1+I_2)/2$. The pixel whose intensity best corresponds to the mean value M will be defined as being part of the shadow border 19. The course of the shadow border 19 is preferably vertically to the transport direction T, which means that the plane containing the LEDs 7 and the shadow edge 10 is vertical to transport direction T.

From the course of the shadow border 19 across the object 2, conclusions are drawn as to the contour of the object 2 at this location. Furthermore, the evaluation unit 15 can be programmed to draw conclusions from the course of the shadow border 19 to the surface area of the object 2 in the illuminated plane, and to calculate, if necessary, the volume of the object 2 on the basis of an integration of different surface area values. This volume can be used—as described in the prior art—for cut planning in order to cut, by means of a downstream cutting means, constant-weight portions or slices from the object 2.

FIG. 4 shows the scanning device 1 in combination with a cutting means or cutting machine 40, represented only schematically, for cutting food products 2 into slices. In particular, constant-weight or constant-volume portions or slices shall be obtained by the cutting means from the food object 2 supplied to the cutting means 40. As has already been explained with reference to FIG. 1, the scanning device 1 is disposed alongside a conveyor line 3 on which the to-be-cut-up food objects 2 are supplied via a plurality of conveyor belts 4, 5 to the cutting means 40. In alignment with the conveyor line 3 in the transport direction, a support 41 is provided in the cutting means 40, Said support may be a support table or a further conveyor belt. This support 41 is disposed within a casing 42 of cutting means 40 and can be tilted up around a horizontal axle 44 at its rear end 43 facing the conveyor line 3. In the tilted-up state represented in FIG. 3 by a dashed line, the support 41 forms a support plane, inclined with respect to the horizontal plane, for an object 2 put thereon.

Furthermore, the cutting means 40 comprises a cutting head 44. Said cutting head 44 has a cutting blade 45 driven translationally or rotatively by means of a drive unit 46. The control unit 48 is connected to the scanning device 1 via a suitable connection 49 to exchange data and control commands. The scanning device 1 can thus be considered as combined with the cutting means or cutting machine 40, or as integrated into the cutting means or cutting machine 40.

The cutting means or cutting machine 40 may be, excepted the scanning device 1, a so-called slicer known, for example, from the following documents: DE 3713536 A1, DE 3923337 A1, DE 4413568 C5, DE 10054514 A1, DE 10131701 A1, DE 19604254 B4, DE 10327249 A1, DE 19525741 A1, DE 19713163 A1, De 19839257 A1, DE 19844436 C2, and DE 102009023729 A1. The content of all these documents is herewith explicitly included by reference.

The control and evaluation unit 15 of the scanning device 1 may furthermore be integrated into the scanning device 1 itself. Alternatively, the control and evaluation unit 15 or a part thereof could be implemented in the control unit 48 of the cutting machine or cutting means 40.

During operation of the system represented in FIG. 4, the objects 2 to be cut up are conveyed along the conveyor line 3 to the cutting means 40. During this conveyance, the scanning device 1 detects the contour of the objects 2. Cut planning is done in dependence on the detected contour. Said cut planning can be, but must not be, calculated on the basis of a 3D model of the object 2 obtained from the detected contours. Based on the cut planning, the control unit 48 controls the cutting head 48 in a suitable manner to obtain from the object 2 constant-weight or constant-volume portions or slices.

Starting from the represented embodiments, the scanning device 1 and the method according to the invention can be modified in many different ways. For example, it is conceivable that the shadow edge 10 of shadow caster 9 has a curved course, and that the arrangement of the LEDs 7 also follows a curved line. The position of the light sources 7 and of the shadow caster 9 relative to each other and relative to the object 2 can be settable or adjustable.

In the optical path of the light 8 emitted by the light sources 7, beam-shaping optics 20 represented in dashed lines in FIG. 1 may be provided, said optics being configured to provide a sharper imaging of the light 8 on the lower side of the object 2. The beam-shaping optics 20 may be a lens or a lens system. In particular, it is conceivable that a Fresnel lens is used. The beam-shaping optics 20 may comprise components below and/or above the shadow caster 9, i.e., where appropriate, it may be positioned completely between the shadow caster 9 and the object.

The shadow edge 9, i.e. the shadow-casting structure, must not be a separate component. Rather, it is conceivable that part of the conveyor means, for example the conveyor belt or a support element, is used as the shadow-casting structure 9. Instead of the shadow-casting structure 9, or additionally thereto, a light refracting structure could be used to generate a shadow border.

In a further configuration variant; two shadow edges 10 arranged in parallel to each other may be provided to generate a light strip or a light line as light pattern 11.

Instead of using only one camera 12, a plurality of cameras 12 could be provided to detect the light pattern 11. The camera 12 (or the plurality of cameras 12) could detect the light pattern 11 on the product 2 either directly (as represented in FIG. 1) or indirectly via mirrors.

Finally, a respective scanning device 1 could not only be used for the lower side of product 2 but also for the upper side of product 2. In particular, it is conceivable that a scanning device 1 for scanning the lower side and a further scanning device 1 for scanning the upper side of object 2 are simultaneously provided. In this way, a shadow border 19 could be laid around the whole circumference of the product 2 and be detected. If necessary, a plurality of light sources 7 and a plurality of shadow casters 9 comprising a plurality of shadow edges 10 could be provided. The number of cameras 12 could be correspondingly adapted in order to detect the whole illuminated area of product 2.

The invention claimed is:

1. A scanning device for detecting the contour of an object, said
scanning device comprising:
at least one light source for generating a light pattern on the surface of the object; and
a camera for detecting the light pattern on the surface of the object, characterized in that the at least one light source comprises at least one incoherent light source, and that between the at least one light source and the object, a shadow caster defining the light pattern on the surface area of the object is provided;
wherein the scanning device is configured to be used in a machine configured to cut up food products.

2. The scanning device according to claim 1, characterized in that the at least one light source is a spot light source.

3. The scanning device according to claim 1, characterized in that the at least one incoherent light source is a light emitting diode (LED).

4. The scanning device according to claim 1, characterized in that a plurality of incoherent light sources is provided.

5. The scanning device according to claim 4, characterized in that a plurality of spot light sources is arranged on a straight line.

6. The scanning device according to claim 1, characterized in that the shadow caster comprises a shadow edge.

7. The scanning device according to claim 6, wherein the shadow edge includes a curved portion.

8. The scanning device according to claim 1 further comprising beam-shaping optics.

9. The scanning device according to claim 1, characterized in that the position of the at least one light source, the position or orientation of the shadow caster or an optical characteristic of the beam-shaping optics are adjustable.

10. The scanning device according to claim 1, characterized in that an evaluation unit is adapted to determine the course of a shadow border in the light pattern detected by the camera.

11. The scanning device according to claim 10, characterized in that the evaluation unit is adapted to determine a contour of the object on the basis of the detected course of the shadow border.

12. A method for detecting the contour of an object, said method comprising:
generating a light pattern on the surface area of the object using at least one light source;
detecting the light pattern on the surface area of the object using a camera;
wherein the at least one light source comprises at least one light emitting diode (LED), and in that a shadow caster blocks the path of part of the light from the LED to the object and thereby generates a shadow border on the object; and
wherein the at least one light source and the camera are configured to be used in a machine configured to cut up food products.

13. The method according to claim 12, characterized in that an evaluation unit determines the course of the shadow border in the light pattern detected by the camera.

14. The method according to claim 12, characterized in that the at least one LED is flash-operated.

15. The scanning device according to claim 1 in combination with a cutter for obtaining constant-weight or constant-volume portions or slices from the object in dependency on a cut planning, taking into consideration the contour of the object detected by the scanning device.

* * * * *